United States Patent [19]
Mullins et al.

[11] Patent Number: 5,978,688
[45] Date of Patent: Nov. 2, 1999

[54] APPARATUS AND METHOD FOR PROTOCOL INTERFACE

[75] Inventors: Jacqueline Mullins; Paul Schnizlein; Alan Hendrickson, all of Austin, Tex.

[73] Assignee: Advanced Micro Devices, Inc., Sunnyvale, Calif.

[21] Appl. No.: 08/726,268

[22] Filed: Oct. 4, 1996

Related U.S. Application Data

[63] Continuation-in-part of application No. 08/601,756, Feb. 15, 1996.
[60] Provisional application No. 60/009,443, Dec. 29, 1995.
[51] Int. Cl.[6] .............................. H04Q 7/26; H04Q 7/30; H04J 3/02
[52] U.S. Cl. .......................... 455/557; 455/462; 370/280; 370/521
[58] Field of Search ..................................... 455/462, 509, 455/550, 557, 561, 575; 370/510, 512, 521, 524, 280, 278, 294, 321; 395/500; 379/88.13, 88.14

[56] References Cited

U.S. PATENT DOCUMENTS

| | | | |
|---|---|---|---|
| 4,286,177 | 8/1981 | Hart et al. | 326/100 |
| 4,928,306 | 5/1990 | Biswas et al. | 379/201 |
| 5,384,807 | 1/1995 | Yatim et al. | 375/244 |
| 5,528,623 | 6/1996 | Foster, Jr. | 455/462 |
| 5,555,287 | 9/1996 | Gulick et al. | 455/557 |
| 5,712,848 | 1/1998 | Deutsch | 455/462 |
| 5,757,921 | 5/1998 | Okanobu et al. | 455/550 |
| 5,790,833 | 8/1998 | Gulick et al. | 395/500 |

*Primary Examiner*—Willis R. Wolfe

[57] ABSTRACT

A telephone for digital cordless telecommunications includes a frame formatter for logical channel formatting of transmitted baseband signals and received baseband signals. The telephone comprises a radio interface connection with the frame formatter, a FIFO/codec interface conductively coupled to the frame formatter, an interrupt interface conductively coupled to the frame formatter, a data control logic interface conductively coupled to the frame formatter, and a microcontroller interface conductively coupled to the frame formatter.

11 Claims, 3 Drawing Sheets

APPARATUS AND METHOD FOR PROTOCOL INTERFACE

This application is a continuation-in-part of patent application Ser. No. 08/601,756, entitled "Apparatus and Method for Protocol Interface", filed Feb. 15, 1996, still pending, which was a conversion of a provisional application serial No. 60/009,443, entitled "Apparatus and Method for Protocol Interface", filed Dec. 29, 1995.

BACKGROUND OF THE INVENTION

The present invention relates to an interface of a telecommunications device and, more particularly, to an interface of a frame formatter of a baseband integrated circuit employable in a base unit and a hand unit of a digital cordless telephone.

In conventional cordless telephone systems, a basic communication device typically includes a base unit and a hand unit. The base unit typically has a direct wire link to a standard telecommunications network. The hand unit is mobile the base unit and has no wire link with the base unit. The base unit and hand unit communicate via radio frequency (RF), thus allowing for communications by the hand unit through the base unit with the standard telecommunications network.

Those skilled in the technology have sought to group more and more components on a single integrated circuit or "chip" for use in digital cordless telephones. Many benefits are possible through the grouping of components, such as, for example, smaller size, faster operation, and reduced noise interference. However, grouping of multiple components on a single chip is difficult to design, because suitable pathways for signal communications between the components are limited. The pathways are limited because of the time and space restrictions imposed by virtue of the physical constraints of the single chip.

Digital cordless telephones may exhibit various desired characteristics and advantages according to design of the protocol or "format" (sometimes herein, "frame format") of transmitted and received signals. A variety of formats, both between communications units and between components of those units, may be employed, and each impacts design choices. For example, when a particular, desirable format is communicated over radio frequency, communications units must appropriately operate to make communications possible through that format. Also, if varied applications are intended, the formats of the signal communications by the equipment may be preferable in certain designs as compared to other designs.

In conventional cordless telephone systems, the signals which pass between units and components of a system may include certain control sequences, or "channels", according to particular formats. These control sequences pass between pairs of units, typically a base unit and a hand unit, in both directions. The control sequences may include information such as voice data. The control sequences are dictated to some degree by the structure of the format. In addition to signals passing between pairs of cordless telephone units, signals must pass between various parts of a unit. Those signals passing between parts of a unit may or may not, depending upon the particular content and purpose of the signals, be the same as the signals communicated between unit pairs. Nonetheless, a wide variety of control sequences may be possible in most cases.

The various signals that pass between cordless telephone unit pairs and between the various parts of each of those pairs are necessary to control operations of the parts and units and to maintain communications of data and other information between units and parts. In order to communicate both data information, such as, for example, voice data, and also to control operations through communicated information, it is necessary that both control messages and desired data information pass between parts and units.

SUMMARY OF THE INVENTION

The present invention provides an interface for signal communications between components and sub-parts of a digital cordless telephone. The present invention provides advantages of optimization, efficiency, and accuracy.

The present invention is a digital cordless telephone, having a FIFO/codec, data control logic circuitry, an interrupt controller, and a microcontroller, the telephone adapted for using a frame formatter for logical channel formatting of RF signals. The telephone further includes interfaces for RF signals, and for the FIFO/codec, the data control logic circuitry, the interrupt controller, and the microcontroller, wherein the interfaces are adapted for conductively coupling to the frame formatter.

Another embodiment of the invention is a method of digital cordless telecommunication, wherein the method includes formatting of transmitted baseband signals and received baseband signals. The method comprises the steps of interfacing with a radio, for delivery and reception of the transmitted baseband signal and the received baseband signal, respectively, interfacing with a FIFO/codec to decode and encode the received baseband signal and the transmitted baseband signal, respectively, interfacing with an interrupt controller to maintain veracity of the transmitted baseband signal and the received baseband signal, interfacing with a microcontroller to communicate error and data control signals to receive the received baseband signal and to transmit the transmitted baseband signal, and interfacing with a microcontroller to ensure that the microcontroller conforms operations to receive the received baseband signal and to transmit the transmitted baseband signal.

DESCRIPTION OF THE PREFERRED EMBODIMENT

Figure 1:
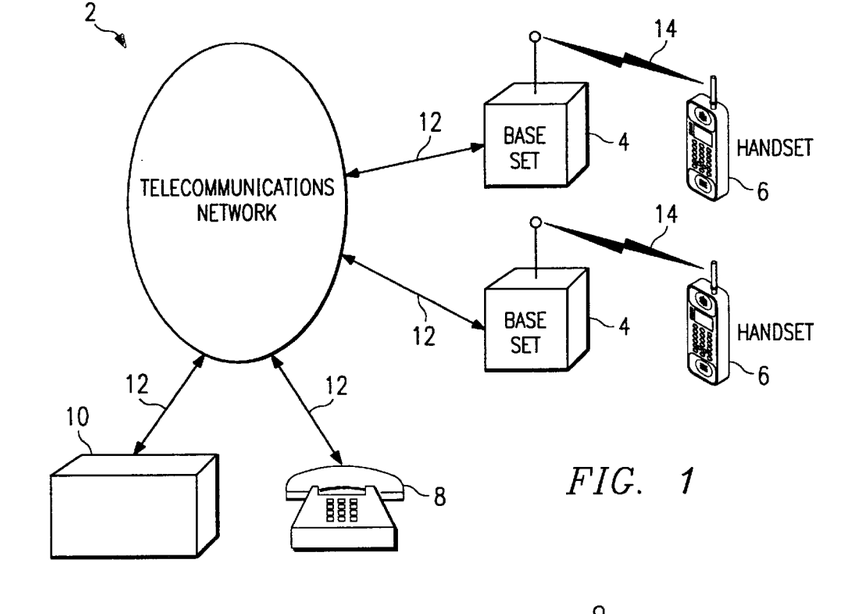
FIG. 1 is an illustration of a telecommunications network connected to several communications units, including a digital cordless telephone base unit and hand unit.

Referring to FIG. 1, several telecommunications devices are connected together to form a telecommunications network 2. The telecommunications network 2 is typically a PSTN (Public Switched Telephone Network), although an ISDN (Integrated Services Digital Network) may also be an application for the embodiments of the invention. For purposes of example only, the illustration of the telecommunications network 2 shows, in particular, base units 4 of two cordless telephones wire-linked with other portions of the telecommunications network 2. Each of the base units 4 has a particular hand unit 6 with which the base unit 4 is in radio frequency (RF) communication. Also, for purposes of example, the telecommunications network 2 is shown to include a typical corded telephone 8 and another telecommunications device 10, which may be, for example, a communications device such as a facsimile machine, a modem for a computer, or some other such device. Each of the devices is connected to the telecommunications network 2 by a network link 12, which may, for example, be a wired-link, an optical fiber link, a long-distance radio link, or some other communications link.

Each of the cordless telephone devices of the illustrated embodiment comprises one base unit 4 and one corresponding hand unit 6. The base unit 4 and hand unit 6 communicate over a radio frequency ("RF") link 14, so that communications information may be passed between the hand unit 6 and base unit 4. The base unit 4, being tied by the network link 12 with the telecommunications network 2, receives communications from the network 2 and passes communications to the network 2. Because the base unit 4 and hand unit 6 are capable of passing communications information back and forth between the units 4, 6, communications from the telecommunications network 2 may be passed to the hand unit 6 and passed from the hand unit 6 to the telecommunications network 2, each via the base unit 4 and the link 12.

Typically, the base unit 4 of a cordless telephone is virtually immobile, or at most mobile over a very limited range, because of the fixed physical length of the network link 12 to such unit 4. The same is true of the typical corded telephone 8 and other telecommunications device 10 because each is linked to the network 2 by a fixed physical length connector, such as a wire, optical fiber, or other equipment, which serves as the network link 12. In the illustration of FIG. 1, it is of note that in comparison to the corded telephone 8, communications device 10, and base unit 4, the hand unit 6 may have much greater mobility. This is so because the hand unit 6 is mobile with respect to the base unit 4 and unimpeded by a fixed physical length connector such as the link 12. Instead of such a connector, communications between base unit 4 and hand unit 6 occur over the RF link 14. Although there are typically distance limits to capabilities of RF communication over the RF link 14, the RF communications between base unit 4 and hand unit 6 over the RF link 14 may generally be accomplished at greater and varied distances between base unit 4 and hand unit 6 in comparison to the fixed physical length connector as the network link 12 of other types of devices. Such an RF link 14 between base unit 4 and hand unit 6, versus some other physical network link 12, such as a fixed length wire, thus, provides much greater flexibility of use of the hand unit 6 at varied locations during communications.

Although variations and improvements are continually being made in cordless telephone devices 4, 6, such as those illustrated in FIG. 1, embodiments of the present invention will be applicable to many of those variations and improvements. Certain variations and improvements in the cordless telephone devices 4, 6 could include, for example, multiple hand units 6 communicating with a single base unit 4; hand unit 6 communications capability with any one of a group of base units 4 capable of such communications, when in the vicinity of a base unit 4 of the group; office branch exchanges or intercom systems with multiple hand units 6 communicating with one or more base units 4; and others. Although the embodiments of the present invention expressly described herein are discussed primarily in reference to a configuration of one base unit 4 with a network 12 being dedicated to a single hand unit 6, and vice-versa, the descriptions should not be considered limited to that configuration. As those in the art will readily appreciate, multiple variations, with various advantages and attributes of each, are possible.

Figure 2:
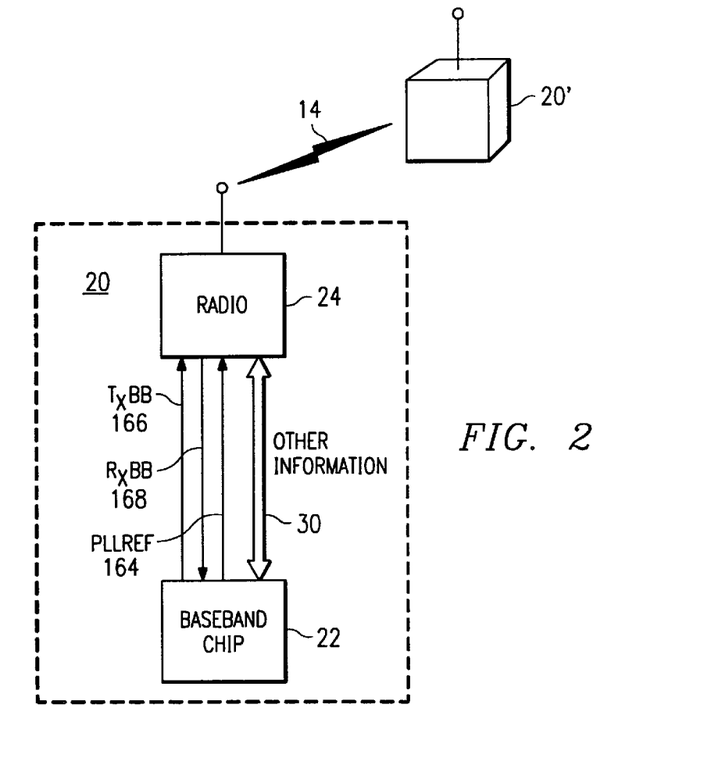
FIG. 2 is a block diagram of a radio and a baseband chip in the base unit or hand unit shown in FIG. 1.

Now referring to FIG. 2, a cordless telecommunications unit 20, which may be either a base unit 4 or a hand unit 6, includes two main parts. The two parts are a baseband chip 22 and a radio 24. The baseband chip 22 may include a variety of devices, such as various controllers, codecs, formatters, and other functions. The baseband chip 22 may be a single semiconductor chip, some other integrated circuit, or other functional circuitry. The radio 24 may also include various functionality, such as, for example, various oscillators, up and down convertors, synthesizers, and antennas. As with the baseband chip 22, the radio 24 may be a semiconductor device, another integrated circuit, or other circuitry. A particularly desirable cordless telecommunications unit 20 comprises a baseband chip 22 which operates at CMOS-levels and transmits and receives various signals to and from the radio 24 at those levels. The radio 24 of such a desirable unit 20 converts RF signals 14 to and from the CMOS-level baseband signals of the baseband chip 22 to enable RF communications among corresponding base units and hand units 4, 6.

In embodiments of the present invention, the baseband chip 22 and radio 24 of the unit 20 pass signals, such as a transmit baseband (TXBB) signal on a TXBB bus 166, a receive baseband (RXBB) signal on a RXBB bus 168, and a phase-lock loop reference clock (PLLREF) output signal on a PLLREF bus 164, each between the other. In addition to those signals, various other signals 30 may be passed between the radio 24 and the baseband chip 22 to accomplish a variety of purposes, for example, reset, wake-up, power monitor, interrupt, and a wide variety of other purposes depending upon the interfacing aspects and desired functions of the unit 20.

Although not detailed herein because not necessary to understanding the embodiments of the present invention and generally known to those skilled in the art, the cordless telecommunications unit 20 may be equipped with various peripherals (not shown) in order to allow appropriate usability and desired operations. The peripherals may include, for example, matters such as power, power controls, touch keys, on/off controls, speakers, LCD's, transducers, such as microphones and ear pieces, key scanners, and other peripheral elements. In order to function as a digital cordless telephone, the telecommunications unit 20 must be equipped with a variety of those peripherals and others, as those skilled in the art will know and appreciate.

Figure 3:
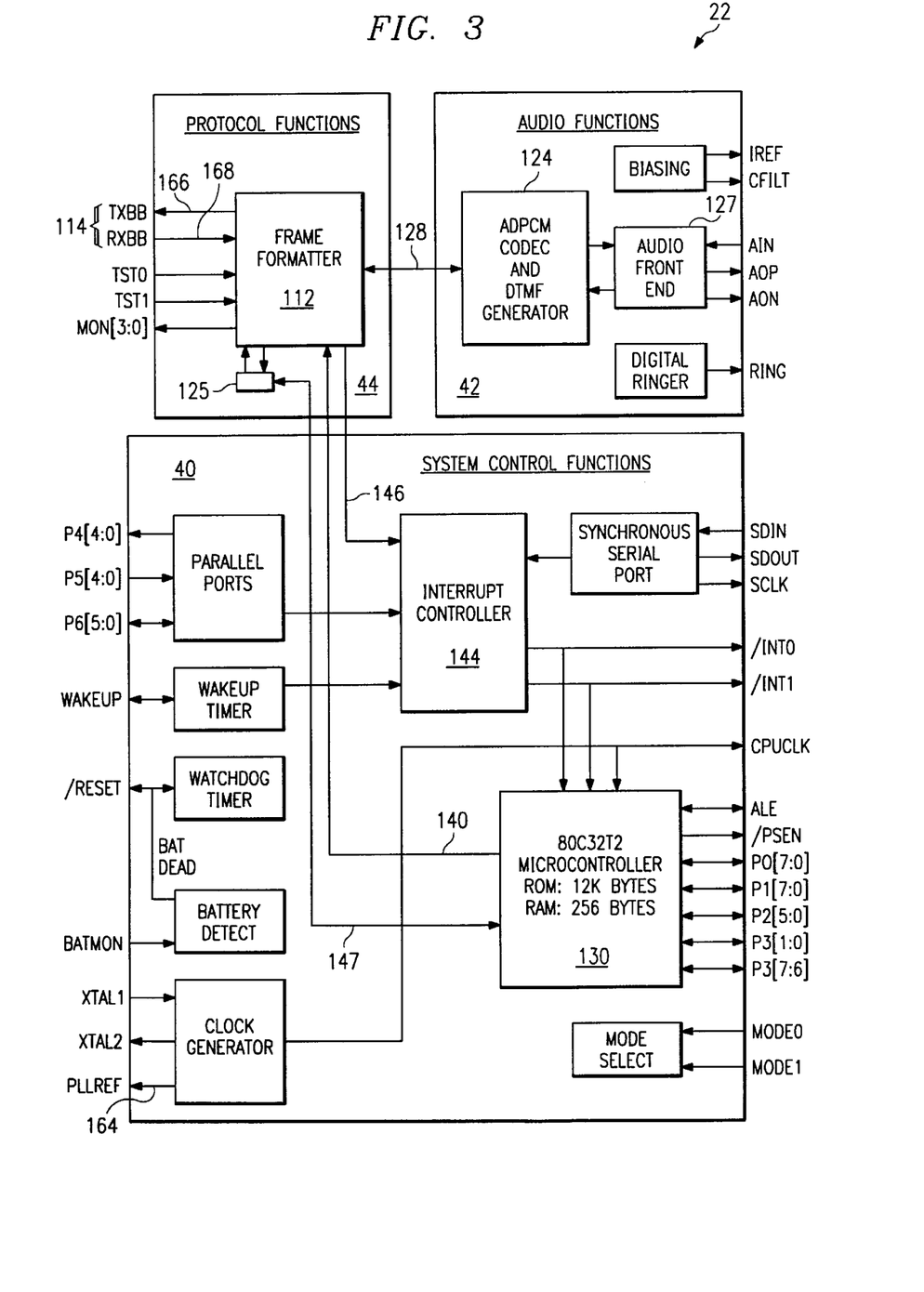
FIG. 3 is a block diagram of functional blocks of a baseband chip of the digital cordless telephone.

Referring now to FIG. 3, the reference numeral 22 refers, in general, to the baseband chip 22 of a cordless telecommunications unit 20 (shown in FIG. 2). The functional blocks of the embodiment of the chip 22 are shown in FIG. 3. Generally, the baseband chip 22 includes various elements forming a system control function block 40, an audio functions block 42, and a protocol function block 44. These functional blocks 40, 42, 44 of the baseband chip 22 are each particularly interfaced to connect with others of the functional blocks 40, 42, 44 and external elements in desired manners to accomplish desired and preferred communication through use of some particular data sequence format ("frame format").

The embodiments of the present invention comprise the interfaces of the protocol function block 44 with the other functional blocks 40, 42 of the chip 22 and with the radio 24 (shown in FIG. 2). The protocol function block 44 includes a typical formatter mechanism ("frame formatter") for formatting signals passed from the block 44 and for detecting appropriately formatted signals passed to the block 44. Details of the frame formatter of the protocol function block 44 are not detailed herein because those skilled in the art generally know and understand typical frame formatter configurations and components. Furthermore, in order to understand the various embodiments of the present invention, it is sufficient merely to understand that the frame formatter formats signals for transmission and enables reception of appropriately formatted received signals. The embodiments of the invention provide a suitable interface for a wide variety of frame formats and frame formatters.

In general, there are five primary interfaces to the protocol function block 44. Each of those interfaces is with the frame formatter of the protocol function block 44. The five interfaces are: (1) a radio interface 114, connecting the frame formatter with the radio 24 (shown in FIG. 2) of the telecommunications unit 20 (also shown in FIG. 2); (2) a first-in-first-out ("FIFO")/codec interface 128, connecting a FIFO element of the frame formatter with a codec 124 of the audio functions block 42; (3) an interrupt controller interface 146, connecting the frame formatter with an interrupt controller 144 of the system control functions 40 block; (4) a data control logic interface 147, connecting a data control logic circuitry 125 of the frame formatter with the microcontroller 130; and (5) a microcontroller interface 140, connecting the frame formatter with a microcontroller 130 of the system control functions 40 block. These five interfaces of the frame formatter of the protocol function block 44 enable operations of the baseband chip 22 when a frame format, such as, for example, a multiple logical channel format or some other format of transmitted and received data, is employed.

Turning now to discussion of each of the five interfaces 114, 128, 140, 146, 147 in greater detail, particular aspects and characteristics of the interfaces 114, 128, 140, 146, 147 as they operate to enable desirable communications utilizing a frame format may be better understood. Beginning with discussion of the radio interface 114, the radio interface 114 comprises a TXBB bus 166 and a RXBB bus 168. These buses 166, 168 allow the baseband chip 22 to communicate baseband signals with the radio 24 (shown in FIG. 2) of the cordless telecommunications unit 20 (FIG. 2). The baseband signals may be communicated according to a desirable frame format therefor, such as, for example, a three logical channel format or some other multiple channel or other format. The buses 166, 168 may, for example, be configured to operate in a serial manner or in some other manner.

The microcontroller interface 140 is for programming registers that enable and control the B-channel, D-channel, and the SYN-channel of a frame formatter 112 shown in FIG. 3. The microcontroller interface 140 directly connects the microcontroller 130 with certain registers (not shown in detail) of the frame formatter. Those registers may be supplied with certain information by the microcontroller, via the microcontroller interface 140. The information maintained in those registers may be used at the frame formatter to control the frame formatter operation. Software may, for example, cause the microcontroller 130 to write certain values to the registers. Those values, then, control the frame formatter operations. The values may dictate the start of transmission, the synchronization pattern to be detected, the data to be transmitted over certain logical channels, or other matters at the frame formatter.

The microcontroller interface 140 includes six registers: Formatter Control Register ("CONTROL"); Receive Timing Recovery Register ("RXTMGR"); Operating Parameter Limits Register ("LIMITS"); SYN Channel Pattern, Word 1 ("SYNCWRD1"); SYN Channel Pattern, Word 2 ("SYNCWRD2"); and Frame Sync Control Command ("SYNCTR").

CONTROL Register
Address: FFC6
Default: 0000 xx00
Access: read/write

| Bit 7 | Bit 6 | Bit 5 | Bit 4 | Bit 3 | Bit 2 | Bit 1 | Bit 0 |
|---|---|---|---|---|---|---|---|
| MAS-TER/SLAVE | EN-ABLE TX | EN-ABLE B | RX IN-VERT | RE-SER-VED | RE-SER-VED | CON-TIN TX | RX SPEED |

Bit 7: Master/Slave Selection
  0:=the baseband transmitter operates as a timing master
  1:=the transmitter timing is derived from the receiver clock recovery system.
Bit 6: ENABLE TX allows the transmitter to function.
  0:=the transmitter is disabled and the TXBB pin is held low.
  1:=the transmitter is enabled and the TXBB pin toggles.
Bit 5: ENABLE B allows the B Channel to operate.
  0:=Transmit and receive B channel paths between the FIFO's and the 32 kbps ADPCM B channel data stream at the codec are disabled. The FIFO output goes to hex nibble F in both the transmit and receive directions.
  1:=Transmit and receive B channel paths through the FIFO's are enabled. That is, the baseband B channel is connected to the 32 kbps ADPCM stream in the audio functions block 42 of the chip.
Bit 4: RX INVERT selectively inverts recovered receive data.
  0:=Recovered data is not inverted.
  1:=Recovered data is inverted.
Bit 1: D Channel Continuous Transmit Mode Select
  0:=Normal mode. After the transmit buffer is empty, D channel bits are filled with the IDLE__D pattern until the next code word is initiated. Emptying the buffer causes the transmit buffer empty interrupt.
  1:=Continuous transmission mode. Packets including the same six information bytes of the transmit buffer are transmitted repeatedly. This bit must be written before the associated code word byte 5 is written to TXBUF5. The transmit buffer empty interrupt is not generated.
Bit 0: RXSPEED controls the speed of the clock recovery circuit.
  0:=Fast mode; the DCO is adjusted once for each correction pulse.
  1:=Slow mode; the DCO is adjusted once four correction pulses in the same direction are accumulated.
RXTMGR Register
Address: FFC8
Default: 00xx xxxx
Access: read only

| Bit 7 | Bit 6 | Bit 5 | Bit 4 | Bit 3 | Bit 2 | Bit 1 | Bit 0 |
|---|---|---|---|---|---|---|---|
| SYNC LOCK | SYNC TRACK | re-served | re-served | re-served | re-served | re-served | re-served |

Bits 7 to 6: Synchronization Lock and Tracking Stats read only). These two bits reflect the status of the SYN channel synchronization state machine, according to the following table.

SYN Channel States

| State | RXTMGR Register | |
|---|---|---|
| | SYNC LOCK | SYNC TRACK |
| Acquire | 0 | 0 |
| Track | 0 | 1 |
| Lock | 1 | 1 |
| (not possible) | 1 | 0 |

LIMITS Register
Address: FFC9
Default: 0000 0000
Access: read/write

| Bit 7 | Bit 6 | Bit 5 | Bit 4 | Bit 3 | Bit 2 | Bit 1 | Bit 0 |
|---|---|---|---|---|---|---|---|
| BERRLIM | | SYNCREL | | SYNTHR | | | |

Bits 7 to 6: BERRLIM

The BERRLIM field sets the threshold for the B Channel error counter. If the B Channel error counter exceeds BERRLIM, a MUTETRIG event is issued at the end of the frame. Coding is shown in the following table.

| BERRLIM | B Channel Error Count Threshold |
|---|---|
| 00 | 0 |
| 01 | 1 |
| 10 | 2 |
| 11 | 3 |

Bits 5 to 4: SYNCREL

The SYNCREL field defines the SYNC error count which causes the receiver to exit the locked state and enter the acquire state. Coding is shown in the following table.

| SYNCREL | SYN Channel Error Count Threshold |
|---|---|
| 00 | 4 |
| 01 | 8 |
| 10 | 16 |
| 11 | 32 |

Bits 3 to 0: SYNTHR

The SYNTHR field determines the number of consecutive frames in which the SYNC pattern is correctly received, in order for the synchronization state machine to progress from the track state to the lock state. Legal values are 1 to 16 (binary coded, as in the above table, with 0000 corresponding to 1 event and 1111 corresponding to 16 events). Software should not reduce SYNTHR while the state machine is in the track state. Because the circuit compares the SYNTHR value with a counter for equality, lowering SYNTHR may have the undesirable effect of requiring the counter to roll over through zero before the comparison is successful. To avoid this behavior, issue a SYNCTR command when reducing SYNTHR.

SYNCWRD1 Register
Address: FFCA
Default: 1101 0000
Access: read/write

SYNCWRD1 defines the lower order eight bits of the 12-bit SYN Channel pattern, which is common to both transmission and reception. The SYNC pattern is transmitted and received with the most significant bit first.

| Bit 7 | Bit 6 | Bit 5 | Bit 4 | Bit 3 | Bit 2 | Bit 1 | Bit 0 |
|---|---|---|---|---|---|---|---|
| SYN [7] | SYNC [6] | SYNC [5] | SYNC [4] | SYNC [3] | SYNC [2] | SYNC [1] | SYNC [0] |

Bits 7 to 0: SYNC[7 to 0].
SYNCWRD2 Register
Address: FFCB
Default: xxxx 1110
Access: read/write SYNCWRD2 defines the upper four bits of the 12-bit SYN Channel pattern, which is common to both transmission and reception. The SYNC pattern is transmitted and received most significant bit first.

| Bit 7 | Bit 6 | Bit 5 | Bit 4 | Bit 3 | Bit 2 | Bit 1 | Bit 0 |
|---|---|---|---|---|---|---|---|
| reserved | reserved | reserved | reserved | SYNC [11] | SYNC [10] | SYNC [9] | SYNC [8] |

Bits 3 to 0: SYNC [11 to 8].
SYNCTR Register
Address: FFD0
Default: not applicable
Access: write only SYNCTR is a command (address decode) with no associated data field. Writing SYNCTR causes the frame synchronization state machine to be cleared to the acquire state. If the device is a transmitter timing master, its transmitter is unaffected by SYNCTR. If the device transmitter is slaved to the receiver, the transmitter will revert to master mode with a free-running timing source whenever frame synchronization is not in the locked state.

In addition to the microcontroller interface 140, the microcontroller 130 and frame formatter also interface through the data control logic circuitry 125 via the data control logic interface 147. The data control logic interface 147 is for transmitting and receiving data control messages associated with a telecommunications link between the base unit 4 and the hand unit 6 in FIG. 2. The data control logic interface 147 provides for passage of control data between the data control logic circuitry 125 of the frame formatter and the microcontroller 130. Such data may be passed both ways across the interface 147. The data control logic circuitry 125 comprises many error communication flags, such as cyclic redundancy check (not shown) and parity errors (also not shown). Furthermore, the data control logic 125 provides status communication flags, such as receive buffer full and transmit buffer empty (each also not shown). These flags are used to control the frame formatter, and to communicate with the remote unit 20 (FIG. 2).

The data control logic interface 147 includes thirteen registers: a D Channel Receive Buffer ("RXBUF0–5") (six registers); a D Channel Transmit Buffer ("TXBUF0–5") (six registers); and a D Channel Status ("DCHSTAT") (one register).
RXBUF0–5 Register
Address:
　RXBUF0 FFC0
　RXBUF1 FFC1
　RXBUF2 FFC2

RXBUF3 FFC3
RXBUF4 FFC4
RXBUF5 FFC5
Default: xxxx xxxx
Access: read only

Received D channel data is stored in the D channel receive buffer, sized to receive six bytes, starting with RXBUF0 bit 0 (corresponding to bit 1 of byte 1 in the information payload) and ending with RXBUF5 bit 7 (bit 8 of byte 6). The receive buffer full flag is set by hardware when the last bit of the code word is received. The flag is cleared by reading the most significant byte of the buffer (FFC5).

| Bit 7 | Bit 6 | Bit 5 | Bit 4 | Bit 3 | Bit 2 | Bit 1 | Bit 0 |
|---|---|---|---|---|---|---|---|
| RX-BUFx [7] | RX-BUFx [6] | RX-BUFx [5] | RX-BUFx [4] | RX-BUFx [3] | RX-BUFx [2] | RX-BUFx [1] | RX-BUFx [0] |

TXBUF0–5 Register
Address:
TXBUF0 FFC0
TXBUF1 FFC1
TXBUF2 FFC2
TXBUF3 FFC3
TXBUF4 FFC4
TXBUF5 FFC5
Default: xxxx xxxx
Access: write only The 6 transmit buffer bytes are transmitted serially in the D channel, starting with TXBUF0 bit 0 (corresponding to bit 1 of byte 1 in the information payload) and ending with TXBUF5 bit 7 (bit 8 of byte 6). When the buffer is empty, the "transmit buffer empty" flag is set. Writing the last byte, TXBUF5, clears the flag.

| Bit 7 | Bit 6 | Bit 5 | Bit 4 | Bit 3 | Bit 2 | Bit 1 | Bit 0 |
|---|---|---|---|---|---|---|---|
| TX-BUFx [7] | TX-BUFx [6] | TX-BUFx [5] | TX-BUFx [4] | TX-BUFx [3] | TX-BUFx [2] | TX-BUFx [1] | TX-BUFx [0] |

DCHSTAT Register
Address: FFE4
Default: 0000 0100
Access: read only
DCHSTAT reports the D channel transceiver status.

| Bit 7 | Bit 6 | Bit 5 | Bit 4 | Bit 3 | Bit 2 | Bit 1 | Bit 0 |
|---|---|---|---|---|---|---|---|
| reserved | reserved | reserved | reserved | DRX OF | DTX EMPTY | DRX ERR | DRX FULL |

Bits 7 to 4: Reserved. Reads return zeroes.
Bit 3: D Channel Receive Buffer Overflow. This bit is cleared by reading the DCHSTAT register. Failing to read the DCHSTAT to clear this bit does not inhibit further D Channel reception, provided the D Channel receiver is serviced by reading the receive buffer.
  0:=The receiver is not in an overflow condition.
  1:=The D channel receive buffer RXBUF is full and a new packet has been detected. Existing buffer data is not overwritten and the new packet is lost. The overflow indicator is set by hardware at the end of the packet which was rejected due to overflow, upon reception of the parity bit. Timing is such that if the buffer overflows after reception of a first packet, but is serviced during the following packet time interval, the DRXOF flag is set simultaneously with the DRXFULL flag indicating completion of the second (overflowed and lost) packet.
Bit 2: D Channel Transmit Buffer Empty. This bit is cleared by writing to the sixth transmit buffer byte, TXBUF5.
  0:=The D channel transmit buffer TXBUF is not empty.
  1:=TXBUF is empty (default).
Bit 1: D Channel Receive CRC or Parity Error. This bit is cleared when the DCHSTAT register is read.
  0:=There is no CRC or parity error.
  1:=A CRC or parity error occurred in the D channel receiver. When an error is detected, the flag is set simultaneously with the associated DRXFULL buffer full flag. In the case of an overflow in the receive buffer, the DRXERR flag reflects the CRC and parity check results of the packet retained in the buffer and does not reflect the check results of the overflowed (lost) packet.
Bit 0: D Channel Receive Buffer Full. This bit is set when the buffer is full, upon reception of the parity bit, and cleared when RXBUF5 is read.
  0:=The receive buffer has not been filled since RXBUF5 was last read.
  1:=The D channel receive buffer, RXBUF0–RXBUF5, contains 6 bytes.

D Channel Operation

A 16-bit SYNCD pattern prefixes every D channel message. It is automatically inserted by the transmitter and serves as a beginning of a message indicator for the receiver. The SYNCD pattern is 1100.0100.1101.0111, in chronological order. When SYNCD is transmitted, it is completely contained within one baseband frame, and the subsequent frames of the packet each contain 2 complete D channel bytes. The receiver is sensitive only to SYNCD patterns entirely contained within one frame. The six information bytes are loaded by software into the transmit buffer TXBUF, or read by software from the receive buffer RXBUF.

A 16-bit CRC field is generated from the six information bytes. The 48 information bits constitute the coefficients of a polynomial with terms $X^{62}$ to $X^{15}$. This polynomial is divided by the generating polynomial:

$$X^{15}+X^{14}+X^{13}+X^{11}+X^1+X^2+X^1$$

The 15 CRC bits correspond to the $X^{14}$ to $X^0$ terms of the remainder of the division and are transmitted most-significant bit first. Bit 6 of Byte 7 (the last transmitted CRC bit, $X^0$) is inverted. The parity bit, bit 7 of Byte 7, is calculated so that the 64-bit code word (not including the SYNCD pattern) has even parity. When no D channel packets are being transmitted, the D channel contains a continuous stream of zeros.

The following table summarizes the operation of the D channel.

| D Channel | |
|---|---|
| Transmitter | Receiver |
| | Automatic hardware SYNCD search |
| SYNCD inserted by hardware | SYNCD Hardware recognizes SYNCD |

-continued

D Channel

| Transmitter | Receiver |
|---|---|
| Software loads the Transmit Buffer (TXBUF0-5) | Buffer Byte 0<br>Buffer Byte 1<br>Buffer Byte 2<br>Buffer Byte 3<br>Buffer Byte 4 |
| Buffer empty - DTXEMPTY interrupt | Buffer Byte 5 |
| CRC/Parity inserted by hardware. | CRC<br>CRC  Parity  CRC/Parity Checked by hardware. CRC/Parity Error - DRXERR status bit. Receive Buffer full - DRXFULL Interrupt. Software reads the Receive Buffer (RXBUF0-5) |
| Software may reload the buffer for new code words, or enable continuous transmission of the same code word. | • Hardware begins new<br>• seek for SYNCD.<br>•<br>•<br>• |
| | IDLE_D   Hardware ignores data until a new SYNCD is detected |
| Hardware inserts IDLE_D when there are no more code words. | IDLE_D |

The following table shows the D channel order of transmission.

| Frame No. | Order of transmission | | Order of transmission |
|---|---|---|---|
| 1 | 1011 0100 1101 0111 (SYNCD) | | |
| 2 | LSB MSB Byte 0 | LSB MSB Byte 1 | |
| 3 | LSB MSB Byte 2 | LSB MSB Byte 3 | |
| 4 | LSB MSB Byte 4 | LSB MSB Byte 5 | |
| 5 | MSB  CRC | LSB  P | |
| | ←————— 16-Bit D Channel —————→ | | |

D Channel Transmit Operation

When a packet is to be transmitted, software loads the transmit buffer with the 6 bytes of the code word. The act of writing the 6th byte starts the transmission, provided the ENABLE TX control bit has been previously set. The transmitter first drives the SYNCD pattern and begins transmission of the data bytes contained in the buffer. Once the six code word bytes have been sent, the transmitter sends the CRC field and appends the parity bit.

The D channel transmitter drives IDLE_D after transmission has been initiated and the transmit buffer has been emptied. The transmit buffer cannot be programmed to transmit IDLE_D, because of its automatic CRC generation.

When the transmit buffer empties, the formatter propagates a DTXEMPTY interrupt to the central interrupt controller through a MISCR0 register, subject to masking in a MIMSK0 register. DTXEMPTY status is reported in the DCHSTAT register, and occurs when the last buffer byte is read from the buffer into a serializing shift register, approximately 2.875 milliseconds before the end of the packet transmission. If consecutive code words are to be transmitted without intervening IDLE_D bits, the next code word must be written within 3.125 milliseconds of the DTXEMPTY interrupt (42 bits (last code word byte)+1 frame (CRC and parity)+12 bits (SYNC)).

After the first code word of a packet is transmitted, the transmitter continues transmission in one of three ways:
1) If the buffer has not been reloaded, it sends IDLE_D after the check field and parity bit.
2) If more bytes are loaded in the buffer, it begins transmitting the next packet, prefixed with SYNCD, in the next bit position after the check field and parity bit.
3) If continuous transmission is enabled in a CONTIN TX bit of the CONTROL register, the six buffer bytes will be repeated in successive packets. The DTXEMPTY interrupt is not asserted in this mode.

D Channel Receive Operation

The telephone of the present invention acquires D channel synchronization by locating SYNCD in the D channel stream. Hardware clears D channel synchronization whenever frame synchronization state machine enters the Acquire state. D Channel synchronization begins only when frame synchronization enters the Track or Lock state. After recognizing a SYNCD pattern, the receiver starts collecting the following six bytes of D channel data making up a code word.

The six D channel information bytes are loaded in the receive buffer. The following 16 bits of CRC and parity are routed to a CRC/Parity check circuit, which generates a DRXERR flag in case of error. At the end of the check field reception, the DRXFULL interrupt notifies software that the receive buffer contains a code word. The check field is not loaded in the receive buffer. DRXERR and DRXFULL flags are reported in the DCHSTAT register and DRXFULL is forwarded as an interrupt to the MISRC0 register in the interrupt controller, masked by the MIMSK0 register.

Upon complete reception of a packet, hardware automatically clears D channel synchronization and begins seeking the next SYNCD. If software fails to read the buffer contents before the arrival of Byte 0[0] of the next packet, an overflow flag (DRXOF) is generated at the end of the new packet, and reported in DCHSTAT. The new packet is not allowed to overwrite the previous packet stored in the buffer. The read timing restriction implies a maximum allowable software read latency of 2.39 milliseconds, assuming maximum packet arrival rate (minimum delay of zero frames between packets).

The interrupt controller interface 146 is for receiving status bits and interrupt signals related to the B-channel, D-channel, and the SYN-channel of the frame formatter 112. The interrupt controller interface 146 directly connects an interrupt controller 144 with the frame formatter 112. The frame formatter 112 may pass interrupt signals or status bits to the interrupt controller 144 over the interrupt controller interface 146. The interrupt signals and status bits passed over the interrupt controller interface 146 may serve a variety of purposes, as those skilled in the art will know and appreciate. Certain particular reasons those signals and bits may be sent by the frame formatter to the interrupt controller 144 may include, for example, to indicate conditions of signals at the radio interface 114 or other conditions or matters.

The interrupt controller interface 146 includes six registers: Sync Interrupt Source Register ("SYNCSRC"); SYNC Mask Register ("SYNCMASK"); Main Interrupt Source Register 0 ("MISRC0"); Main Interrupt Source Register 1 ("MISRC1"); Main Interrupt Mask Register 0 ("MIMSK0"); and Main Interrupt Mask Register 1 ("MIMSK1").

SYNCSRC Register
Address: FFE5
Default: 0000 0x0x
Access: read only

SYNCSRC reports SYN channel interrupt sources. Flags are set when the corresponding event occurs, regardless of the programming of the associated mask bit in SYNCMASK. All bits are cleared by reading the register.

| Bit 7 | Bit 6 | Bit 5 | Bit 4 | Bit 3 | Bit 2 | Bit 1 | Bit 0 |
|---|---|---|---|---|---|---|---|
| reserved | reserved | reserved | reserved | SYNC LOST | reserved | SYNC LOCK | reserved |

Bits 7 to 4: Reserved. Reads return zeroes.
Bit 3: The SYNC LOST interrupt goes high when the SYNC LOCK status bit reflected in RXTMGR[7] goes from High to Low.
    0:=SYNC LOCK has not transitioned from High to Low since the last reading of this register.
    1:=SYNC LOCK has transitioned from High to Low since the last reading of this register.
Bit 2: Reserved. Reads return zeroes.
Bit 1: The SYNC LOCK interrupt goes high when the SYNC LOCK status bit reflected in RXTMGR[7] goes from Low to High.
    0:=SYNC LOCK has not transitioned from Low to High since the last reading of this register.
    1:=SYNC LOCK has transitioned from Low to High since the last reading of this register.
Bit 0: Reserved. Reads return zeroes.

SYNCMASK Register
Address: FFE6
Default: xxxx 0x0x
Access: read/write

SYNCMASK provides individual enables for each interrupt source in SYNCSRC.
    0:=disable interrupt.
    1:=enable interrupt.

| Bit 7 | Bit 6 | Bit 5 | Bit 4 | Bit 3 | Bit 2 | Bit 1 | Bit 0 |
|---|---|---|---|---|---|---|---|
| reserved | reserved | reserved | reserved | SYNC LOST | reserved | SYNC LOCK | reserved |

Bit 3: Sync Lost Interrupt Mask.
Bit 1: Sync Lock Interrupt Mask.

MISRC0 Register
Address: FFE0
Default: 0000 0000
Access: Read only

A 1 in any bit of MISRC0 causes an active (low) level at the 8051/INT0 input. Bits are individually masked in MIMSK0.

| Bit 7 | Bit 6 | Bit 5 | Bit 4 | Bit 3 | Bit 2 | Bit 1 | Bit 0 |
|---|---|---|---|---|---|---|---|
| reserved | reserved | MUTE TRIG | reserved | reserved | DTX EMPTY | reserved | DRX FULL |

Bits 7 to 6: Reserved. Reads return zeroes.
Bit 5: MUTE TRIG
    The Mute Trigger interrupt is set if the B Channel error counter exceeds the value specified in the BERRLIM field of the LIMITS register, subject to the mask bit MIMSK0[5]. The bit is cleared by reading NSCTR.
    0:=The MUTETRIG interrupt is inactive or MIMSK0[5]=0.
    1:=The MUTETRIG interrupt is active and MIMSK0[5]=1.
Bit 4: Reserved. Reads return zeroes.
Bit 3: Reserved. Reads return zeroes.
Bit 2: DTXEMPTY is the D channel transmit buffer empty status, DCHSTAT[2], subject to MIMSK0[2].
    0:=The D channel transmit buffer is not empty or MIMSK0[2]=0.
    1:=The D channel transmit buffer is empty (default) and MIMSK0[2]=1.
Bit 1: Reserved. Reads return zeroes.
Bit 0: DRXFULL is the D channel receive buffer full status, DCHSTAT[0], subject to MIMSK0[0].
    0:=The D channel receive buffer, RXBUF0–RXBUF5, has not filled since RXBUF5 was last read or MIMSK0[0]=0.
    1:=RXBUF is full and MIMSK0[0]=1.

MISRC1 Register
Address: FFE1
Default: 0000 0000
Access: read only

A 1 in any bit of MISRC1 causes an active (low) level at the 8051/INT1 input. Bits are individually masked in MIMSK1.

| Bit 7 | Bit 6 | Bit 5 | Bit 4 | Bit 3 | Bit 2 | Bit 1 | Bit 0 |
|---|---|---|---|---|---|---|---|
| WAKE UP | P1 INT 2 | P1 INT 1 | P1 INT 0 | SYNC | SIO | PORT5 | reserved |

Bit 7: WAKE UP
    The WAKE UP interrupt occurs at each terminal count of the WAKE UP timer counter and is masked by MIMSK1[7]. The interrupt is cleared by reading the WAKE UP register.
    0:=There is no WAKE UP interrupt active or MIMSK1[7]=0.
    1:=The WAKE UP interrupt is active and MIMSK1[7]=1.
Bit 6: P1 INT 2
    Port 1 Interrupt 2 is active when an interrupt at pins P1[7 to 4] has occurred, enabled by P1MAS, and is cleared by reading P1SRC2.
    0:=No interrupts on pins P1[7 to 4] have occurred or MIMSK1[6]=0.
    1:=An interrupt on pins P1[7 to 4] has occurred and MIMSK1[6]=1.
Bit 5: P1 INT 1
    Port 1 Interrupt 1 is active when an interrupt at pins P1 [3 to 2] has occurred, enabled by P1MASK, and is cleared by reading P1SRC1.
    0:=No interrupts on pins P1[3 to 2] have occurred or MIMSK1[5]=0.

1:=An interrupt on pins P1[3 to 2] has occurred and MIMSK1[5]=1.

Bit 4: P1 INT 0

Port 1 Interrupt 0 is active when an interrupt at pins P1[1 to 0] has occurred, enabled by P1MASK, and is cleared by reading P1SRC0.

0:=No interrupts on pins P1[1 to 0] have occurred or MIMSK1[4]=0.

1:=An interrupt on pins P1[1 to 0] has occurred and MIMSK1[4]=1.

Bit 3: SYNC

The SYN channel SYNC interrupt is active if either interrupt source reported in SYNCSRC is true, subject to MIMSK1[3], and is cleared by reading SYNCSRC.

0:=No SYNCSRC bit is set or MIMSK1[3]=0.

1:=A SYNCSRC bit is set and MIMSK1[3]=1.

Bit 2: SIO

The serial port interrupt is active when either of the two interrupt sources reported in SIOISR are true, and is cleared when SIOSRC is read.

0:=There is no serial port interrupt or MIMSK1[2]=0.

1:=There is a serial port interrupt and MIMSK1[2]=1.

Bit 1: PORT5

The PORT5 interrupt occurs every time the input code on the P5 port pins changes, and is intended for keypad detection. The mask bit MIMSK1[1] is automatically bypassed during shutdown, so that PORT5 (key pad) activity will always wake the chip out of shutdown mode. The interrupt is cleared by reading PORT5.

0:=There is no PORT5 interrupt or MIMSK1[1]=0.

1:=There is a PORT5 interrupt and MIMSK1[1]=1.

Bit 0: Reserved. Reads back zero.

MIMSK0 Register

Address: FFE2

Default: xx0x x0x0

Access: Read/write

MIMSK0 provides individual enables for each interrupt source in MISRCO.

0:=Disable interrupt.

1:=Enable interrupt.

| Bit 7 | Bit 6 | Bit 5 | Bit 4 | Bit 3 | Bit 2 | Bit 1 | Bit 0 |
|---|---|---|---|---|---|---|---|
| re-served | re-served | MUTE TRIG | re-served | re-served | DTX EMP-TY | re-served | DRX FULL |

Bits 7 to 6: Reserved, unused. Reads return zeroes.

Bit 5: Mute Trigger Interrupt Mask.

Bit 4: Reserved, unused.

Bit 3: Reserved, unused.

Bit 2: D Channel Transmit Buffer Empty Interrupt Mask.

Bit 1: Reserved, unused.

Bit 0: D Channel Receive Buffer Full Interrupt Mask.

MIMSK1 Register

Address: FFE3

Default: 0000 000x

Access: Read/write

MIMSK1 provides individual enables for each interrupt source in MISRC1.

0:=Disable interrupt.

1:=Enable interrupt.

| Bit 7 | Bit 6 | Bit 5 | Bit 4 | Bit 3 | Bit 2 | Bit 1 | Bit 0 |
|---|---|---|---|---|---|---|---|
| WAKEUP | P1 INT 2 | P1 INT 1 | P1 INT 0 | SYNC | SIO | PORT5 | reserved |

Bit 7: Wakeup Timer Mask

This mask is bypassed during shutdown so that any wakeup timer interrupt causes the 8051/INT1 interrupt to be active. After IC wake-up and after MISRC1 is read, the mask returns to normal operation.

Bit 6: Port 1 Interrupt 2 Mask.

Bit 5: Port 1 Interrupt 1 Mask.

Bit 4: Port 1 Interrupt 0 Mask

Bit 3: Sync Interrupt Mask.

Bit 2: Synchronous Serial Port Interrupt Mask.

Bit 1: Port 5 (key pad) Interrupt Mask.

This mask is bypassed during shutdown so that any keypad activity causes the 8051/INT1 interrupt to be active. After IC wake-up and after MISRC1 is read, the mask returns to normal operation.

Bit 0: Reserved, unused.

Now referring to the FIFO/codec interface 128, the FIFO/codec interface 128 is for synchronizing data transfer between the frame formatter 112 and an audio front end circuitry 127. More specifically, the FIFO/codec interface 128 serves to interface FIFO (first in first out) buffers 52, 56 (shown in FIG. 4) of the frame formatter with the codec 124, which is an adaptive differential pulse code modulator (ADPCM). The codec 124 performs 32 kbps ADPCM conversion in accordance with the industry standard CCITT G.721. The codec is timed by an 8 kHz frame clock. The codec 124 defaults to unknown values, and therefore must be initialized before enabling it. The codec 124 acts as an ADPCM←→PCM transcoder as required.

The FIFO/codec interface 128 also provides for passage of data, for example, voice data, between a FIFO buffer 56 (shown in FIG. 4), and the codec 124. Such data may be passed both ways across the interface 128. The FIFO buffers 52, 56, in such embodiment, may serve as a buffer between the codec 124 and the frame formatter. The codec 124 acts as an interface between an audio front end 127 and the FIFO buffers 52, 56.

The FIFO buffers 52, 56 may also, according to certain embodiments, accept clock timing adjustment information from the frame formatter. Based on such information, the FIFO buffers 52, 56 may enable corrections dictated by the frame formatter to the internal clocks. Corrected internal clocks may, for example, be passed over the FIFO/codec interface 128 to the codec 124 and employed to keep the chip 22 (shown in FIG. 2) synchronized.

Figure 4:
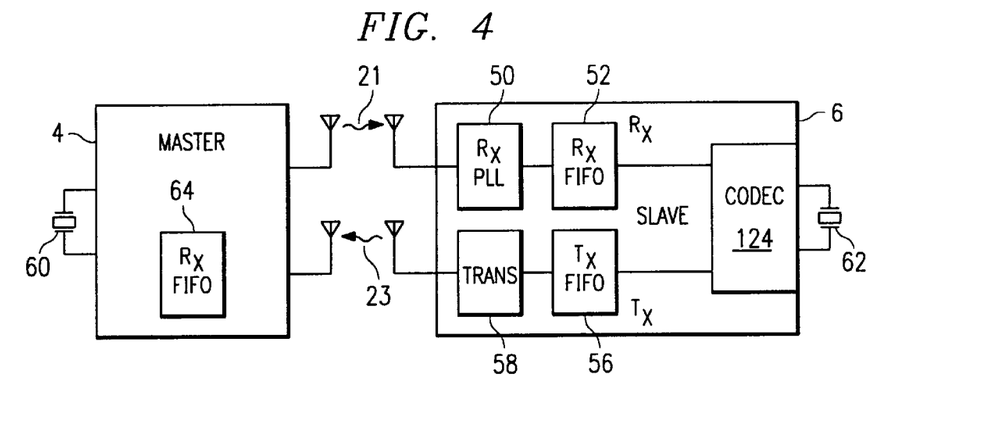
FIG. 4 is a block diagram of a base unit and a hand unit.

Referring to FIG. 4, the FIFO/codec interface 128 is shown in the hand unit 6 as element numbers 52, 56, and 124. The units 4 and 6 are synchronized by making the base unit 4 behave as a master for timing, and the hand unit 6 as a slave to the timing of the master. The designation of master and slave, as well as the designation of the units as base unit 4 and hand unit 6, may be different in practice and the designation herein should be considered only as an example useful for illustration. In practice, the master and slave units may be any telecommunications unit 20 of a communications system and either of the units 4, 6 could be the master and the other the slave.

The hand unit 6 includes a receive signal phase lock loop 50 for locking onto a receive signal 21 to the hand unit 6 from the base unit 4. The hand unit 6 also includes a receive FIFO buffer 52 for receiving the receive signal 21 detected by the phase lock loop 50. The codec 124 of the hand unit 6 makes data from the receive FIFO buffer 52 available for use by the hand unit 6. Data from the codec 124 may also be passed to a transmit FIFO buffer 56 of the hand unit 6 and on to a transmitter 58 of the hand unit 6. The transmitter 58 may transmit signals from the hand unit 6 to the base unit 4. The base unit 4 may include corresponding components to the hand unit 6, or other similar components that enable communications between the units 4, 6.

The base unit 4 and the hand unit 6 each has its own internal crystal, crystal 60 and crystal 62, respectively. The respective crystals 60, 62 of the units 4, 6 provide internal timing for operations of the units 4, 6. In order to achieve synchronization for communications between the base unit 4 and hand unit 6, however, the hand unit 6 is slaved to the timing of the base unit 4. This is accomplished through communications of timing signals by the base unit 4 to the hand unit 6, as received signal 21. In the synchronization arrangement, the transmit timing of the hand unit 6 may be derived from the receive signal 21 in such a manner that the transmit timing for transmit signal 23 is also a slave of the timing of the base unit 4. The receive FIFO buffer 52, the transmit FIFO buffer 56, and the codec 124 comprise the FIFO/codec interface 128.

Figure 5:
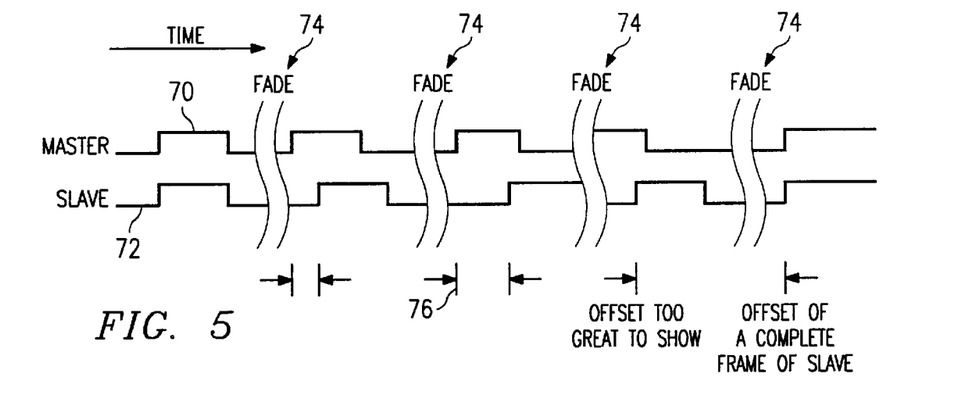
FIG. 5 is an illustration of waveforms of the timing of the signals between the master and slave units of FIG. 4, showing intermittent fades and resulting offset due to drift of one waveform in relation to the other.

Referring to FIG. 5, an illustrative master timing waveform 70 and a slave timing waveform 72 are shown. Over time various fades 74 may interrupt the waveforms 70, 72. When so interrupted, the base unit 4 and hand unit 6 each revert to operation in accordance with the internal timing of the units 4, 6 derived from their respective crystals 60, 62. As fades 74 occur, the synchronization of timing drifts between the base unit 4, as master, and the hand unit 6, as slave. This drifting results in offsets 76 of the master timing waveform 70 and slave timing waveform 72. Over time, the drifting may be so great that the offset 76 between the master timing waveform 70 and the slave timing waveform 72 is at least as great as a complete cycle of one of the waveforms 70, 72.

For purposes of example, the slave timing waveform 72 is illustrated in FIG. 5 as being slower than the master timing waveform 70. Being slower, the offset 76 may increase such that the master timing waveform 70 completes a cycle that has not been initiated by the slave timing waveform 72. In that case, the missed cycle of the slave unit, the hand unit 6 in this case, will never occur. As those skilled in the art will readily appreciate and understand, the reverse situation could be true as well, depending upon which of the master unit or the slave unit has a faster internal clock from its respective crystal 60, 62.

In any event, loss of a timing cycle by either of the master or slave unit results in the underflow or overflow of data in the respective unit 4, 6. An underflow of receive data at the hand unit 6 results in the codec 124 attempting to handle data that is not available at the receive FIFO buffer 52 of the hand unit 6. Alternatively, an overflow of the receive FIFO buffer 52 may occur if the timing of the hand unit 6 is slow compared to the base unit 4. In that case of overflow, the base unit 4 as master will have its receive FIFO buffer 64 underflowing because the hand unit 6 is slow and has not transmitted as much as the base unit 4 expected.

Figure 6:
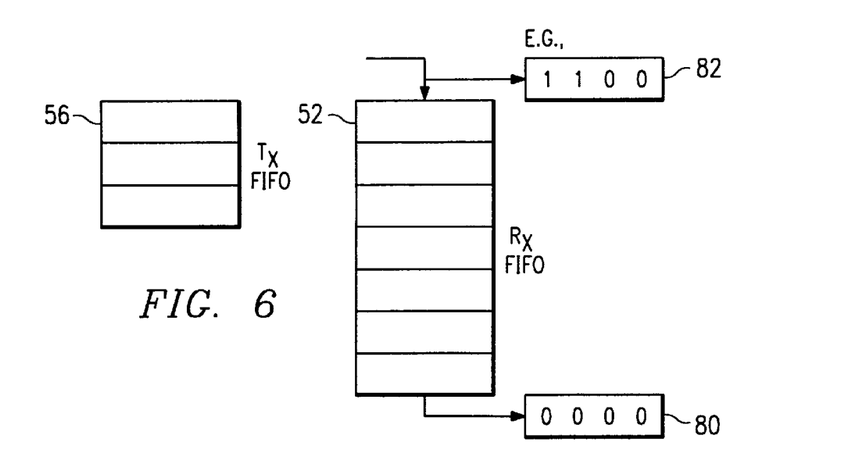
FIG. 6 is an illustration of FIFO operation in the event of an overflow or underflow resulting from offset between master and slave timing of a complete frame.

Referring to FIG. 6, the transmit FIFO buffer 56 of the hand unit 6 is maintained without underflow or overflow. This is accomplished by inserting an insert data word 80 in the FIFO buffer 52 if there is an underflow at the receive FIFO buffer 52 or discarding a discard data word 82 from the FIFO buffer 52 if there is an overflow at the receive FIFO buffer 52.

When an insert data word 80 is inserted because of underflow, that word 80 consists solely of zeros. Such an insert data word 80 is considered a null by the hand unit 6 circuitry and does not invoke particular operations of the hand unit 6 in response. Thus, no change in the state of the hand unit 6 results from such a null insert data word 80.

In the case of overflow of the receive FIFO buffer 52, a discard data word 82 is discarded to prevent overflow. Although the discarding of the discard data word 82 results in loss of some data, that loss is minimal and of no significance when the data is communications data. In any event, the loss of the data of a single discard data word 82 from time to time is insignificant in comparison to the loss of a complete timing cycle which could otherwise result, as previously described. The loss of a timing cycle or gain of a timing cycle at the hand unit 6 does not impede operations according to the embodiments of the invention, and only the single null insert data word 80 is inserted or the discard data word 82 is discarded, resulting in little or no disruption of receipt and transmission of communications data between the units 4, 6.

Pursuant to these embodiments of the interfaces 114, 128, 140, 146, 147 of the frame formatter of the protocol function block 44 of the baseband chip 22, a multichannel data format may be transmitted and received by the frame formatter in a desired manner. The multichannel data format may comprise several distinct logical channels, such as, for example, three logical channels. In such example, the three logical channels may include a transparent voice channel, a data control channel, and a frame synchronization channel. Such a three channel format may be followed in communications between the baseband chip 22 (FIGS. 2 and 3) and the radio 24 (FIG. 2) of a cordless telecommunications unit 20 (FIG. 2). That three channel format could also be followed in RF communications units 20, 20' (FIG. 2), such as, for example, the base unit 4 and the hand unit 6 of a digital cordless telephone (FIG. 4).

Now referring to FIGS. 1–3, in conjunction, the frame formatter of a unit 20 receives data streams of some particular frame format, such as, for example, the three logical channel format just described. In the case of such three logical channel format, the frame formatter may then extract each of the channels, for example, the synchronization channel, the data control channel, and the voice channel in the case of such three logical channel format. The frame formatter also delivers data streams of the form of the particular frame format to the radio 24 of the unit 20 when transmitting to another unit 20'.

The frame formatter, through the five interfaces 114, 128, 140, 146, 147, may thereby integrate with the baseband chip 22 and the radio 24 to accomplish desired receptions and transmissions of the particular frame format by the telecommunications unit 20. In particular, the audio interface 128 provides an avenue for the voice channel data received over RF by the unit 20 to pass from the frame formatter to the codec 124 for modulation and also an avenue for the voice channel data encoded at the codec 124 to pass to the frame formatter for formatting and delivery to the radio 24 for RF transmission by the unit 20. As for the microcontroller interface 140 and interrupt controller interface 146, each provide for complementary activities directed to overall baseband chip 22 control. For example, the data control channel may be passed over the microcontroller interface 140 from the microcontroller 130 as instructions to the frame formatter for baseband chip 22 transmit and receive operations. The interrupt controller interface 146, in similar fashion, may serve for passage of interrupt signals from the frame formatter to the interrupt controller 144 upon the existence of conditions at or detected by the frame formatter which dictate changes at the microcontroller 130, such as, for example, software or hardware errors and others. As is apparent from FIG. 6, the interrupt controller 144 and microcontroller 130 are operatively intertwined to provide desired operations of the baseband chip 22. Those skilled in the art will know and appreciate the various possibilities for operations under this and other configurations of those components by virtue of the interfaces 114, 128, 140, 146, 147.

It is to be understood that multiple variations and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. An integrated circuit for use in a digital cordless telephone, the telephone including a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the integrated circuit further comprising:

a. an RF interface with said frame formatter comprising transmit and receive lines;
   b. a FIFO/codec interface with said frame formatter for synchronizing data transfer between the frame formatter and an audio front end circuitry;
   c. a data control logic circuitry interface for transmitting and receiving data control messages associated with a telecommunications link between the base unit and the hand unit;
   d. an interrupt controller interface for receiving status bits and interrupt signals related to the B-channel, D-channel, and the SYN-channel of the frame formatter; and
   e. a microcontroller interface for programming registers that enable and control the B-channel, D-channel, and the SYN-channel of the frame formatter.

2. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;
   interfacing with the interrupt controller for receiving status bits and interrupt signals related to the B-channel, D-channel, and the SYN-channel of the frame formatter;
   interfacing with the data control logic circuitry for transmitting and receiving data control messages associated with a telecommunications link between the base unit and the hand unit; and
   interfacing with the microcontroller for programming registers that enable and control the B-channel, D-channel, and the SYN-channel of the frame formatter.

3. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with the FIFO/codec interface for synchronizing data transfer between the frame formatter and an audio front end circuitry;
   interfacing with the interrupt controller for receiving status bits and interrupt signals related to the B-channel, D-channel, and the SYN-channel of the frame formatter;
   interfacing with the data control logic circuitry for transmitting and receiving data control messages associated with a telecommunications link between the base unit and the hand unit;
   interfacing with the microcontroller for programming registers that enable and control the B-channel, D-channel, and the SYN-channel of the frame formatter; and
   interfacing with an RF transmitter and receiver, for delivery and reception of the transmitted baseband signal and the received baseband signal, respectively.

4. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with an RF transmitter and receiver, for delivery and reception of the transmitted baseband signal and the received baseband signal, respectively;
   interfacing with the interrupt controller for receiving status bits and interrupt signals related to the B-channel, D-channel, and the SYN-channel of the frame formatter;

interfacing with the data control logic circuitry for transmitting and receiving data control messages associated with a telecommunications link between the base unit and the hand unit;

interfacing with the microcontroller for programming registers that enable and control the B-channel, D-channel, and the SYN-channel of the frame formatter; and interfacing with the FIFO/codec interface for synchronizing data transfer between the frame formatter and an audio front end circuitry.

5. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the data control logic circuitry for transmitting and receiving data control messages associated with a telecommunications link between the base unit and the hand unit;

interfacing with the microcontroller for programming registers that enable and control the B-channel, D-channel, and the SYN-channel of the frame formatter; and interfacing with the interrupt controller for receiving status bits and interrupt signals related to the B-channel, D-channel, and the SYN-channel of the frame formatter.

6. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the interrupt controller for receiving status bits and interrupt signals related to the B-channel, D-channel, and the SYN-channel of the frame formatter;

interfacing with the microcontroller for programming registers that enable and control the B-channel, D-channel, and the SYN-channel of the frame formatter; and interfacing with the data control logic circuitry for transmitting and receiving data control messages associated with a telecommunications link between the base unit and the hand unit.

7. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with the interrupt controller for receiving status bits and interrupt signals related to the B-channel, D-channel, and the SYN-channel of the frame formatter;

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the data control logic circuitry for transmitting and receiving data control messages associated with a telecommunications link between the base unit and the hand unit; and interfacing with the microcontroller for programming registers that enable and control the B-channel, D-channel, and the SYN-channel of the frame formatter.

8. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with the data control logic circuitry for transmitting and receiving data control messages associated with a telecommunications link between the base unit and the hand unit;

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the interrupt controller for receiving status bits and interrupt signals related to the B-channel, D-channel, and the SYN-channel of the frame formatter; and interfacing with the microcontroller for programming registers that enable and control the B-channel, D-channel, and the SYN-channel of the frame formatter.

9. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with the microcontroller for programming registers that enable and control the B-channel, D-channel, and the SYN-channel of the frame formatter;

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the interrupt controller for receiving status bits and interrupt signals related to the B-channel, D-channel, and the SYN-channel of the frame formatter; and interfacing with the data control logic circuitry for transmitting and receiving data control messages associated with a telecommunications link between the base unit and the hand unit.

10. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with the FIFO/codec interface for synchronizing data transfer between the frame formatter and an audio front end circuitry;

interfacing with the interrupt controller for receiving status bits and interrupt signals related to the B-channel, D-channel, and the SYN-channel of the frame formatter;

interfacing with an RF transmitter and receiver, for delivery and reception of the transmitted baseband signal and the received baseband signal, respectively;

interfacing with the data control logic circuitry for transmitting and receiving data control messages associated with a telecommunications link between the base unit and the hand unit; and interfacing with the microcontroller for programming registers that enable and control the B-channel, D-channel, and the SYN-channel of the frame formatter.

11. A method of communication, the method using an integrated circuit within a digital cordless telecommunications system comprising a base unit and a hand unit, the integrated circuit including a frame formatter for logical channel formatting of RF signals in a format comprising a transparent voice B-channel, an error-controlled, packetized control D-channel, and a framing synchronization SYN-channel, and further having connected to the frame formatter, a FIFO/codec, data control logic circuitry, an interrupt controller, and a microcontroller, the method including formatting a transmitted baseband signal and a received baseband signal, the method comprising the steps of:

interfacing with an RF transmitter and receiver, for delivery and reception of the transmitted baseband signal and the received baseband signal, respectively;

interfacing with the FIFO/codec interface for synchronizing data transfer between the frame formatter and an audio front end circuitry;

interfacing with the microcontroller for programming registers that enable and control the B-channel, D-channel, and the SYN-channel of the frame formatter;

interfacing with the interrupt controller for receiving status bits and interrupt signals related to the B-channel, D-channel, and the SYN-channel of the frame formatter; and interfacing with the data control logic circuitry for transmitting and receiving data control messages associated with a telecommunications link between the base unit and the hand unit.

* * * * *

UNITED STATES PATENT AND TRADEMARK OFFICE
CERTIFICATE OF CORRECTION

PATENT NO. : 5,978,688

DATED : November 2, 1999

INVENTOR(S) : MULLINS et al.

It is certified that error appears in the above-identified patent and that said Letters Patent is hereby corrected as shown below:

Col. 8, line 9: "SYN" should read --SYNC--.

Signed and Sealed this

Tenth Day of April, 2001

Attest:

NICHOLAS P. GODICI

Attesting Officer     Acting Director of the United States Patent and Trademark Office